United States Patent
Navarro

(10) Patent No.: US 12,005,868 B1
(45) Date of Patent: Jun. 11, 2024

(54) BOAT TRAILER RINSING SYSTEM

(71) Applicant: Jose Navarro, Naples, FL (US)

(72) Inventor: Jose Navarro, Naples, FL (US)

( * ) Notice: Subject to any disclaimer, the term of this patent is extended or adjusted under 35 U.S.C. 154(b) by 400 days.

(21) Appl. No.: 17/487,238

(22) Filed: Sep. 28, 2021

(51) Int. Cl.
| | |
|---|---|
| *B60S 1/66* | (2006.01) |
| *B05B 1/20* | (2006.01) |
| *B05B 13/00* | (2006.01) |
| *B08B 3/02* | (2006.01) |
| *B08B 3/08* | (2006.01) |
| *B60P 3/10* | (2006.01) |

(52) U.S. Cl.
CPC ...... *B60S 1/66* (2013.01); *B05B 1/20* (2013.01); *B05B 13/00* (2013.01); *B08B 3/02* (2013.01); *B08B 3/08* (2013.01); *B60P 3/1033* (2013.01)

(58) Field of Classification Search
CPC ..... B63B 2059/065; B63B 59/06; B08B 3/02; B60P 3/1033
See application file for complete search history.

(56) References Cited

U.S. PATENT DOCUMENTS

| | | | | |
|---|---|---|---|---|
| 2,987,067 A | * | 9/1961 | Vani ..................... | B60S 3/04 |
| | | | | 134/102.1 |
| 5,111,762 A | | 5/1992 | Frangiamore | |
| 5,611,487 A | | 3/1997 | Hood | |
| 2008/0018077 A1 | * | 1/2008 | Preece .................. | B60P 3/1033 |
| | | | | 280/414.1 |
| 2016/0185321 A1 | * | 6/2016 | Cramer .................... | B60S 1/66 |
| | | | | 134/123 |
| 2019/0322246 A1 | * | 10/2019 | Sarne ....................... | B60S 1/68 |

FOREIGN PATENT DOCUMENTS

AU          2009200587 A1 *   9/2010   ............... B08B 3/02

* cited by examiner

*Primary Examiner* — Spencer E. Bell
(74) *Attorney, Agent, or Firm* — Sanchelima & Associates, P.A.; Christian Sanchelima; Jesus Sanchelima

(57) ABSTRACT

A boat trailer axle rinsing system including a pipe assembly and a tank assembly is disclosed herein. The pipe assembly includes a flush pipe and a nozzle pipe, the nozzle pipe is connected to the flush pipe by a valve, the nozzle pipe includes a plurality of nozzles to rinse an underside of a boat. The tank assembly includes a tank and a dial. The tank stores a desalination chemical. The dial controls the ratio of dilution of the desalination chemical with water provided to the tank by a water hose or by a pump. The tank has an output having a manifold connected therein. The manifold is connected to the flush pipe to provide the desalination chemical to the nozzle pipe to rinse a boat. The pipe assembly is mounted to a trailer axle. The tank assembly is mounted to a front portion of the trailer axle.

1 Claim, 4 Drawing Sheets

BOAT TRAILER RINSING SYSTEM

BACKGROUND OF THE INVENTION

1. Field of the Invention

The present invention relates to a boat trailer axle rinsing system and, more particularly, to a boat trailer axle rinsing system that includes a flush pipe including high pressure nozzles to rinse the underside of a boat.

2. Description of the Related Art

Several designs for boat trailer axle rinsing systems have been designed in the past. None of them, however, include flush pipes having a plurality of high pressure nozzles. The flush pipes being connected to a tank that dilute desalination chemical with water.

Applicant believes that a related reference corresponds to U.S. Pat. No. 5,611,487 issued for a freshwater trailer rinsing system that includes multiple spray heads attached to the trailer for spraying the boat trailer to remove saltwater for the prevention of corrosion. Applicant believes that another related reference corresponds to U.S. Pat. No. 5,111,762 issued for a self-contained system that is mountable to a boat trailer and is configured with a water tank an air tank which are used for cleaning and rinsing the boat trailer. None of these references, however, teach of a boat trailer axle rinsing system that includes a tank with a dial to dilute water with desalination chemical and a pipe with nozzles to rinse a boat and a trailer axle.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a boat trailer axle rinsing system that prevents corrosion of a trailer axle and a boat.

It is another object of this invention to provide a boat trailer axle rinsing system that can dilute desalination chemical with water to clean a boat and a trailer axle.

It is still another object of the present invention to provide a boat trailer axle rinsing system that includes a pipe with a plurality of high pressure nozzles to clean the minerals from the bottom of a boat and from a trailer axle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
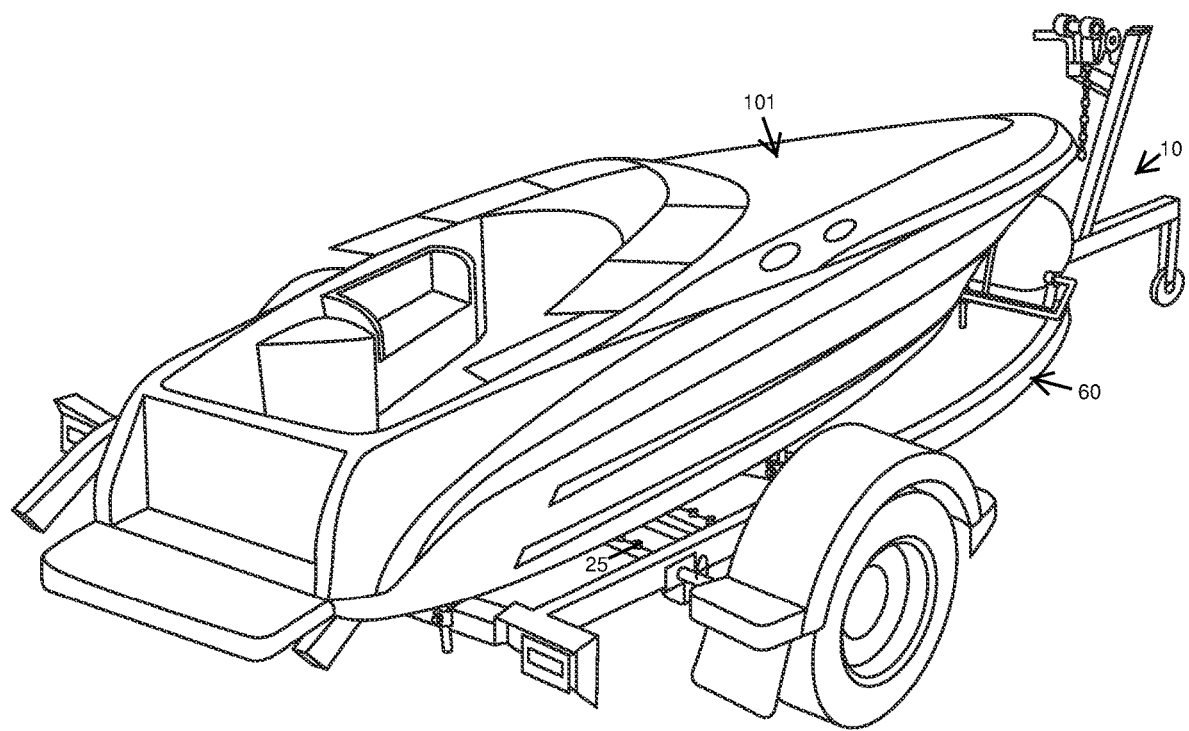
FIG. 1 represents an isometric operational view of the present invention 10 showing nozzles 25 mounted to trailer assembly 60 located underneath a boat 101.

Referring now to the drawings, where the present invention is generally referred to with numeral 10, it can be observed that it basically includes a pipe assembly 20, a tank assembly 40 and a trailer assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The trailer assembly 60 may include a frame 62. The frame 62 may include a left bar 62a and a right bar 62b. The left bar 62a and the right bar 62b may have a first distal end having a curved shape. The first distal end of the left bar 62a and the right bar 62 may be welded. A second distal end of the left bar 62a and a second distal end of the right bar 62b may be connected by a horizontal bar. The frame 62 may receive a boat 101 mounted thereon. The frame 62 also may include an axle 66 for wheels. The axle 66 may be parallel to the horizontal bar. The axle 66 may be attached to the left bar 62a and to the right bar 62b. It should be understood that the trailer assembly 60 may have different elements and configurations.

Figure 3:
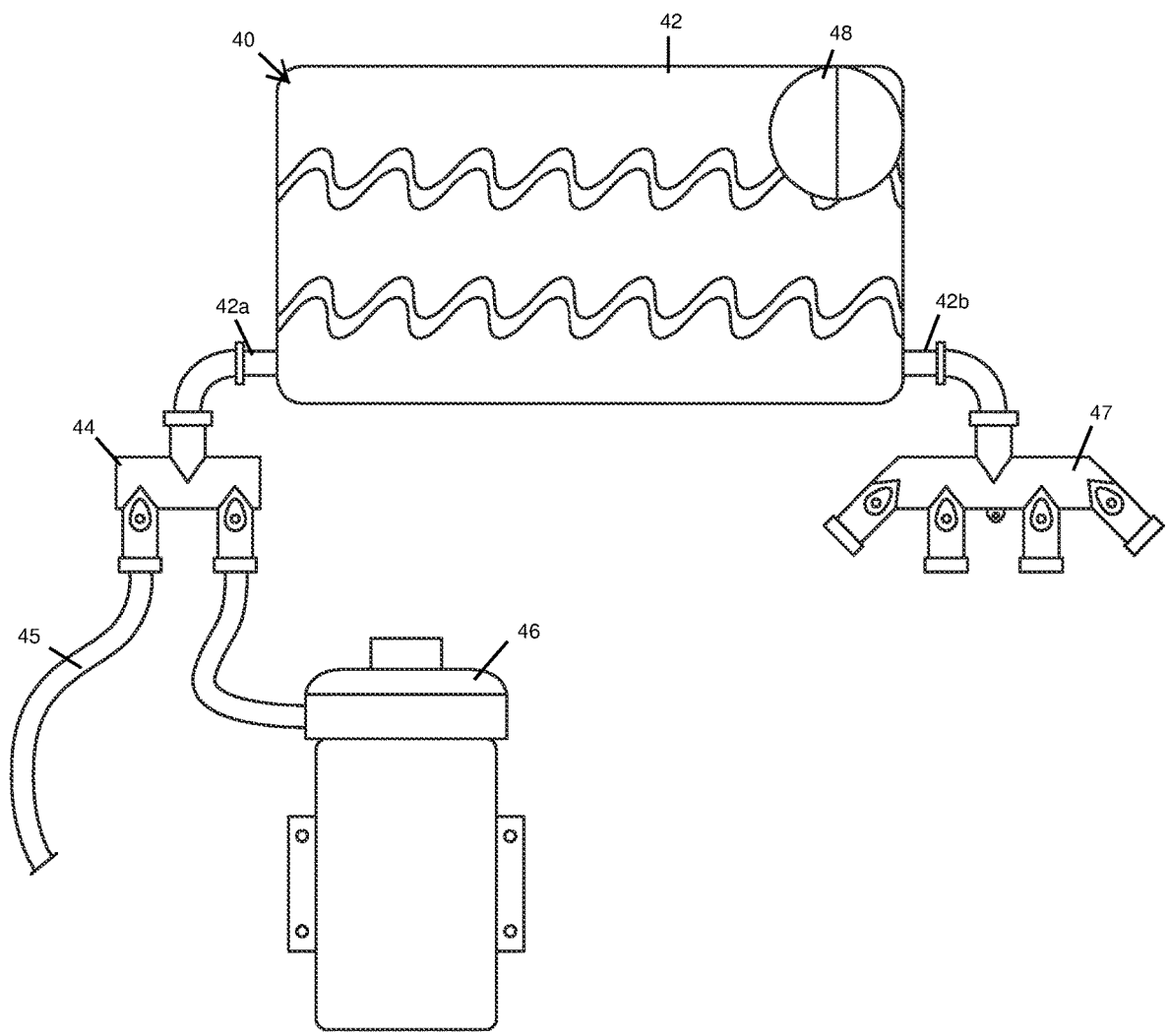
FIG. 3 illustrates a front detailed view of the tank assembly 40 having a dial 48 to select a ratio of a chemical dilution.

Referring now to FIG. 3, the tank assembly 40 may include a tank 42. The tank 42 may have a rectangular shape, an oval shape or any other shape. The tank 42 may be made of a metal, carbon fibers or any other resistant material. The tank 42 may have an interior coating and an exterior coating. The tank 42 may contain a desalination chemical therewithin. The tank 42 may include an input 42a and an output 42b. It should be understood that in different embodiments the tank 42 may include multiple inputs and multiple outputs. In one embodiment, the input 42a may be located on a left side of the tank 42. The input 42a may have a cylindrical shape. The input 42a may include a threaded end to thread a first connector pipe. The first connector pipe may have a shape of a curve. The first connector pipe may be rigid or flexible. The first connector pipe may be threaded to the input 42a. The first connector pipe may be connected to the input 42a by any other method such as welding or glue. The first connector pipe may be connected to a dual pipe manifold 44. The first connector pipe may be threaded, welded or sticked to the dual pipe manifold 44. In one embodiment, the dual pipe manifold 44 may include a first input, a second input and an output. The output of the dual pipe manifold 44 may be connected to the first connector pipe of the input 42a of the tank 42. The first input of the dual pipe manifold 44 may be connected to a hose 45. The hose 45 may be made of nylon, polyurethane, polyethylene, polyvinyl chloride, synthetic rubbers, natural rubbers, or the like. The hose 45 may be connected to a water supply. The hose 45 may supply water to the tank 42. If there is not water supply, the second input of the dual pipe manifold 44 may be connected to a pump 46. The pump 46 may be mounted to a portion of the frame 62 of the trailer assembly 60. The pump 46 may include a housing made of stainless steel. It should be understood that the housing of the pump 46 may be made of any other metal and may include a coating to avoid corrosion. The pump 46 may be an electric pump. In one embodiment the pump 46 may be powered by the electric battery of a motor vehicle. The pump 46 may supply water to the tank.

The output 42b of the tank 42 may be connected to a second connector pipe. The second connector pipe may have a shape of a curve. Any other shape may be suitable for the second connector pipe. The second connector pipe may be flexible or rigid. The second connector pipe may be threaded to the output 42b. The second connector pipe may be connected to the output 42b by any other method such as welding or glue. The second connector pipe may be connected to a pipe manifold 47. The pipe manifold 47 may include at least an input at least two outputs. In one particular embodiment, the pipe manifold 47 may include one single input and four outputs. The single input of the pipe manifold 47 may be threaded, welded or sticked to the second connector pipe. One output of the four outputs of the pipe manifold 47 may be connected to a flush pipe 22 of the pipe assembly 20. The tank 42 also may include a dial 48 to select a ratio of dilution of the desalination chemical contained in the tank 42 and the water supplied whether by the hose 45 or the pump 46.

Figure 2:
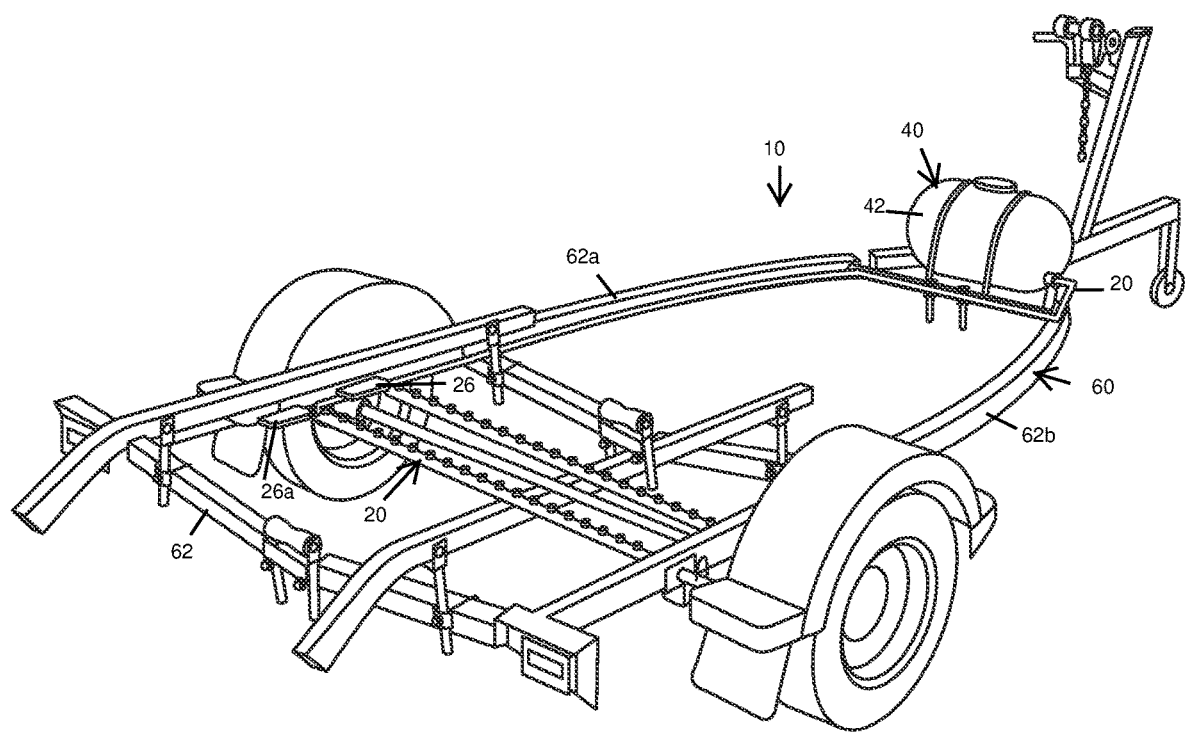
FIG. 2 is an isometric view of the present invention 10 showing the trailer assembly 60, a pipe assembly 20 and a tank assembly 40 mounted to a front portion of said trailer assembly 60.
Figure 4:
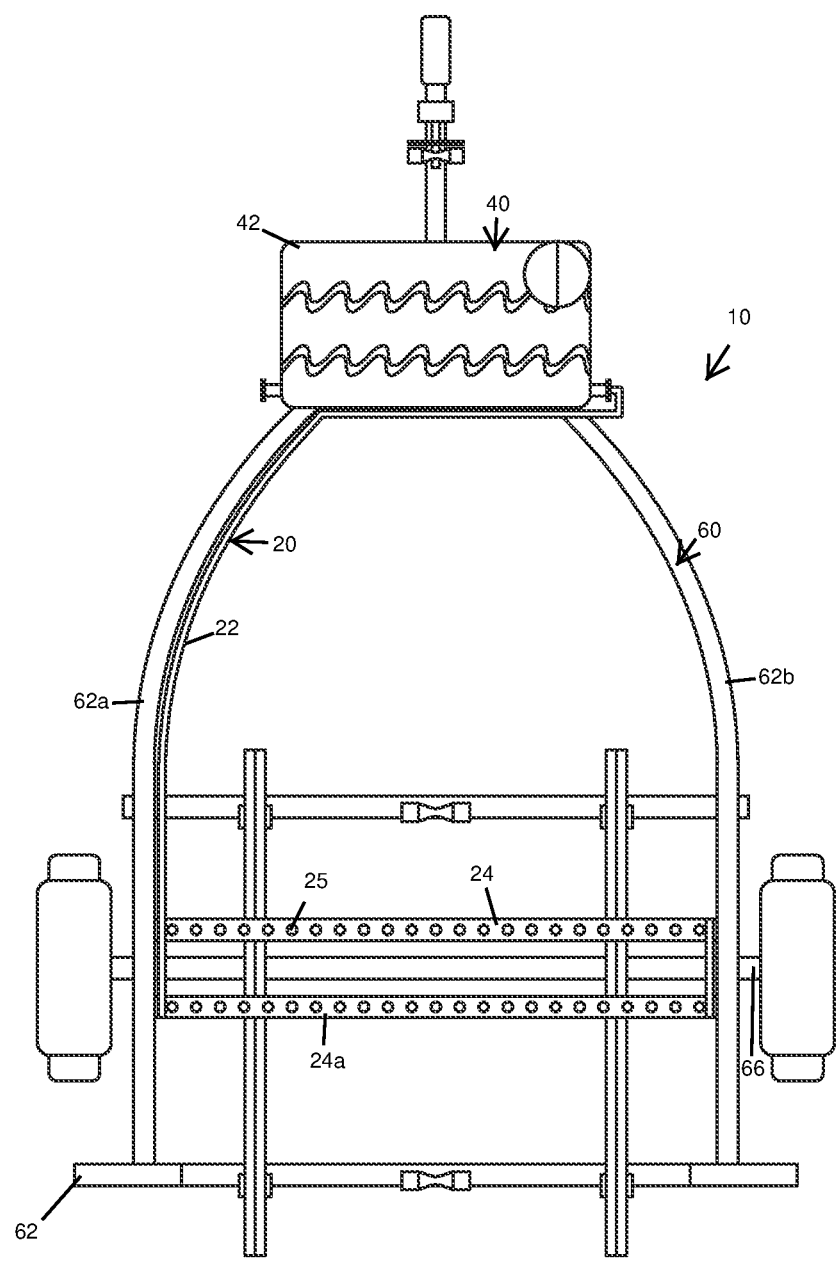
FIG. 4 is a top view of the present invention 10 showing the trailer assembly 60, the tank assembly 40 mounted to a front portion of said trailer assembly 60.

Best observed in FIG. 2 and FIG. 4. The tank 42 may be mounted to a front portion of the frame 62 of the trailer assembly 60. The tank 42 may be mounted to the frame 62 via bolts, fasteners, straps, welding or the like. A distal end of the flush pipe 22 may be connected to the tank assembly 40. The flush pipe 22 may be a flexible hose or a rigid pipe. The flush pipe 22 may be made of nylon, polyurethane, polyethylene, polyvinyl chloride, synthetic rubbers, natural rubbers, or the like. The flush pipe 22 may be secured to a portion of the left bar 62a of the frame 62. The flush pipe 22 may be connected to a first nozzle pipe 24 and to a second nozzle pipe 24a. The first nozzle pipe 24 may include a first valve 26 to control flow of the dilution provided by the tank assembly 40. The second nozzle pipe 24a may include a second valve 26a to control the flow of the dilution provided by the tank assembly 40. The first nozzle pipe 24 and the second nozzle pipe 24a may me secured between the left bar 62a and the right bar 62b. The first nozzle pipe 24 and the second nozzle pipe 24a may be parallel to the axle 66. There may be a separation between the first nozzle pipe 24 and the second nozzle pipe 24a. It should be understood that the first nozzle pipe 24 and the second nozzle pipe 24a may be arranged in any other configuration. The first nozzle pipe 24 and the second nozzle pipe 24a may be made of nylon, polyurethane, polyethylene, polyvinyl chloride, synthetic rubbers, natural rubbers, or the like. The first nozzle pipe 24 and the second nozzle pipe 24a may include a plurality of nozzles 25 along the first nozzle pipe 24 and the second nozzle pipe 24a. The plurality of nozzles 25 may be high pressure nozzles. The plurality of nozzles 25 may spray the dilution provided by the tank assembly 40 to the boat 101. The dilution sprayed by the plurality of nozzles 25 may rinse the boat to avoid corrosion. It also may be suitable to connect multiple hoses to the pipe manifold 47 to rinse different portions of the boat 101 or to rinse the trailer assembly 60.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A boat trailer rinsing system, consisting of:
   a) a trailer assembly;
   b) a pipe assembly including a flush pipe, a first nozzle pipe, and a second nozzle pipe, said first nozzle pipe and said second nozzle pipe being connected to said flush pipe, said first nozzle pipe including a first valve to control flow of a chemical dilution, said second nozzle including a second valve to control flow of the chemical dilution, said first nozzle pipe and said second nozzle pipe having a plurality of high pressure nozzles;
   c) a tank assembly including a tank and a dial, said tank being attached to a front portion of said trailer assembly, said tank is made of stainless steel, said tank having a desalination chemical stored, said dial controls a ratio of dilution of desalination chemical with water defining the chemical dilution, said water is provided to the tank by a pump or by a water hose, said tank having an output connected to a pipe manifold, said pipe manifold is connected to said flush pipe;
   d) said flush pipe is attached to a left bar of said trailer assembly, said first nozzle pipe and said second nozzle pipe being attached between said left bar of the trailer assembly and a right bar of the trailer assembly, said first nozzle pipe and said second nozzle pipe spray the chemical dilution provided by the tank; and
   e) a frame of said trailer assembly being configured to have a boat mounted thereon, said chemical dilution is configured to rinse said boat to avoid corrosion.

* * * * *